(No Model.) 2 Sheets—Sheet 1.

N. O. STARKS & J. A. JOHNSON.
TRANSPLANTER.

No. 511,814. Patented Jan. 2, 1894.

Attest
C. C. Bindine
C. B. Bull

Inventors,
Nils O. Starks
John A. Johnson
per Dodge Son,
Att'ys (No Model.) 2 Sheets—Sheet 2.

N. O. STARKS & J. A. JOHNSON.
TRANSPLANTER.

No. 511,814. Patented Jan. 2, 1894.

Witnesses
C. C. Burdine
C. B. Bull

Inventors,
Nils O. Starks
John A. Johnson,
per Dodge Sons, Attorneys.

THE NATIONAL LITHOGRAPHING COMPANY,
WASHINGTON, D. C.

UNITED STATES PATENT OFFICE.

NILS O. STARKS AND JOHN A. JOHNSON, OF MADISON, WISCONSIN, ASSIGNORS TO THE FULLER & JOHNSON MANUFACTURING COMPANY, OF SAME PLACE.

TRANSPLANTER.

SPECIFICATION forming part of Letters Patent No. 511,814, dated January 2, 1894.

Application filed July 17, 1893. Serial No. 480,733. (No model.)

*To all whom it may concern:*

Be it known that we, NILS O. STARKS and JOHN A. JOHNSON, citizens of the United States, residing at Madison, in the county of Dane and State of Wisconsin, have invented certain new and useful Improvements in Transplanters, of which the following is a specification.

Our invention relates to tobacco transplanters, such for instance as are illustrated in Letters Patent No. 486,200, granted to Starks and Felland, and consists in a novel construction of the furrow opener used on such transplanters.

The objects of the present invention are to so connect the furrow opener to its beam that it may readily yield and adjust itself, bodily, to the ground; to provide for working the opener on hill-sides by enlarging or contracting the opening through which the plants extend and thereby covering the furrow closer to the plants than has heretofore been possible; and, finally, to provide the furrow-opener with an auxiliary shoe which may be used to increase the depth of the furrow.

Figure 1:
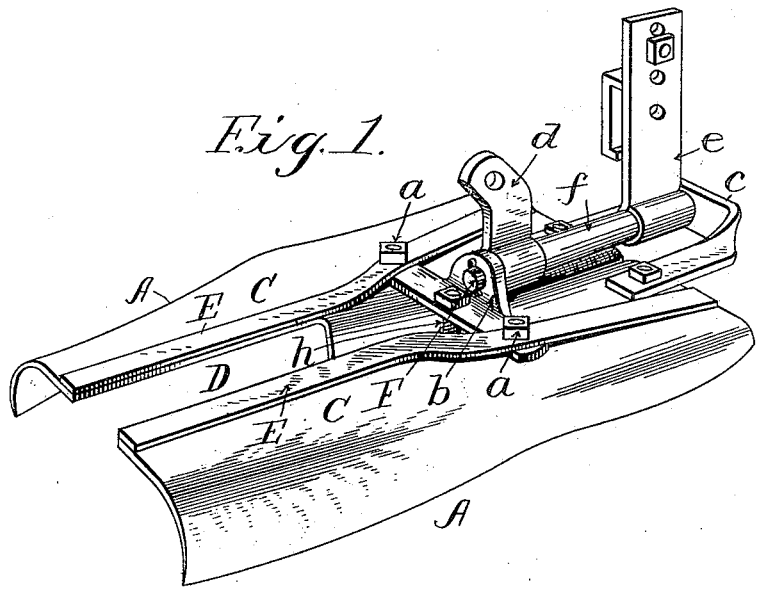
Figure 2:
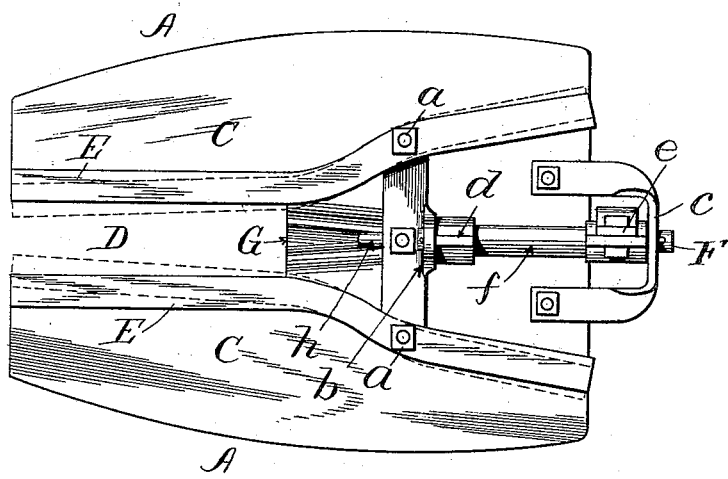
Figure 3:
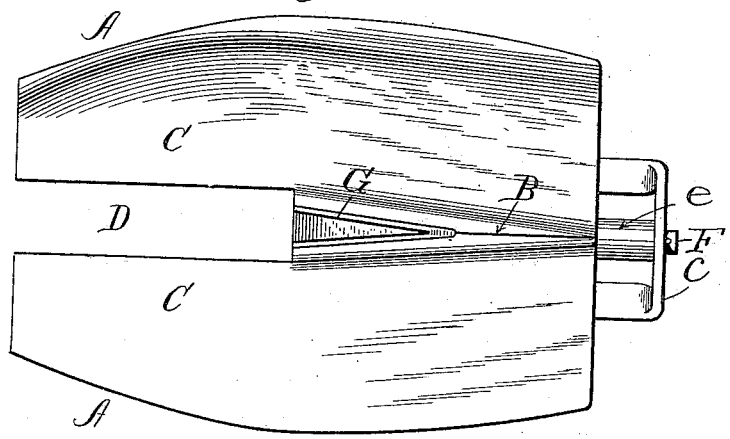
Figure 4:
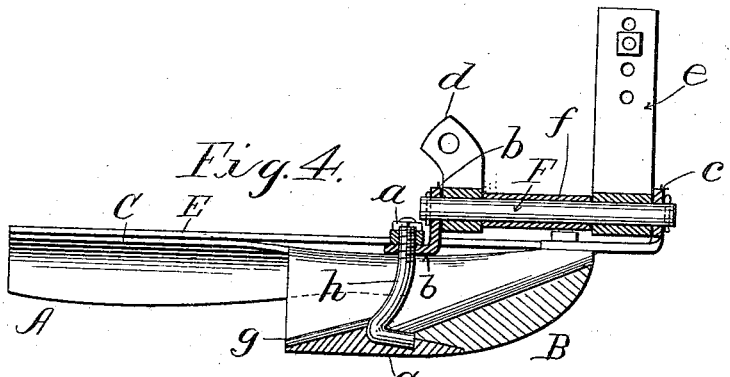
Figure 5:
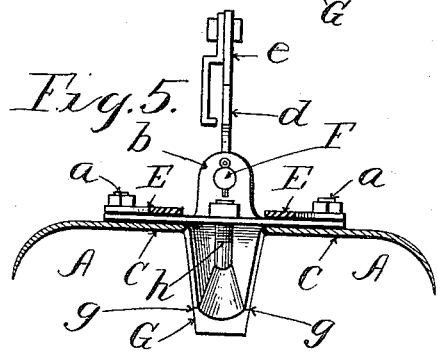

In the drawings,—Figure 1 is a perspective view of our improved opener; Fig. 2, a top plan view; Fig. 3, a bottom plan view; Fig. 4, a side elevation, partly in section; and Fig. 5, a vertical transverse sectional view.

The main body of the furrow opener comprises two plates A A, united at their forward ends so as to form a vertical depending cutting blade B, and substantially horizontal wings C. The blade B extends backward about one-half the length of the furrow opener, and at or about the point at which the blade terminates, the horizontal wings C are separated or cut away at their inner edges so as to afford a space D for the insertion of the plants and also to afford room for the watering-devices commonly used. The outer edges of the wings C are curved or bent downward, and toward the rear are brought gradually closer together so as to cause the dirt to be carried or forced inward over toward the plant.

In working on hill-sides of course the covering plate on the down or furrow side will not come up close to the plant and cover the same properly, and to obviate this difficulty, we provide the additional or auxiliary covering plates E E which, in the present instance, are composed of long narrow flat bars or plates adjustably secured by bolts *a* or other suitable fastenings to the upper or lower faces of the wings C, as shown in Figs. 1, 2, 4 and 5. These bars or plates lie normally near the inner edges of wings C where the latter are cut away or separated, but may be adjusted, alone or together, so as to project to a greater or less extent beyond the inner edges of the wings and thus contract the throat or space D, as shown by the dotted lines in Fig. 2. Other means for contracting this throat will readily suggest themselves to skilled mechanics. Hence we do not wish to be understood as limiting ourselves to the specific details shown.

F indicates a short rod or shaft carried by brackets *b* and *c* secured to the upper face of the furrow opener at its front end. Mounted upon this rod or shaft,—which is slightly above the upper face of the furrow opener,— are one or more swivel clips *d* and *e*, by means of which the opener as a whole is secured to the drag bar or beam. These clips which may be variously constructed without in any manner departing from our invention, are adapted to allow the short rod or shaft F to turn freely therein so that the furrow opener may have a lateral rocking motion relatively to the drag bar or beam or relatively to the main frame of the machine.

We do not wish to be understood as limiting ourselves to the special form of swivel connection shown and just described, as it is obvious that other means of accomplishing the same results will readily suggest themselves to the skilled mechanic. Where two separate swivel clips are employed they will be held apart by means of a sleeve or collar *f* encircling the rod or shaft F as shown.

In the drawings, the rod or shaft F is shown as being swiveled itself in its brackets and held in place by pins, but if desired it may be fixed, and the clips *d e* allowed to turn upon said shaft; or if preferred, the clips may be rigidly affixed to the shaft, and the latter be adapted to turn in its bearings or brackets.

The side walls of the blade B diverge at their rear ends, and fitting into this space is the auxiliary shoe G which extends rearwardly to the end of the blade. The shoe has shoulders g on its sides which come squarely against the lower edges of the side walls of the blade, and is also provided with a bolt h which extends upward through a portion of bracket b (or a separate piece, if preferred) where it is provided with a nut by means of which the shoe is held firmly in place. It is our intention to provide each machine with several of these shoes so that furrows of different depths may be made. When a shallow furrow is desired the shoe may be removed entirely.

Having thus described our invention, what we claim is—

1. In combination with a furrow-opener having the open space D, means applied to the opener for varying the width of the space without changing the width of the furrow-opener.

2. A furrow opener provided with an open space to permit the plants to project therethrough, and also with one or more covering plates adjustable with reference to the opening.

3. In combination with a furrow opener provided with an opening, two bars or plates E each independently adjustably secured to the opener adjacent to one side of the walls of the opening.

4. In combination with a furrow opener provided with an opening, the bars or plates E adjustably secured to the opener adjacent to the side walls of the opening.

5. In a transplanter, the combination with a furrow opener, of a swiveling connection for said opener, directly over the latter whereby it may tip or rock laterally with reference to its beam or to the main frame.

6. In combination with furrow opener A, shaft F carried thereby, and an attaching clip or clips mounted upon the shaft.

7. In combination with furrow opener A, having brackets b c and shaft F, clips d and e, and collar f.

8. In a transplanter, the combination with the plates C C bent inward toward each other and united to form a blade B; of a shoe G applied to the rear end of the blade.

9. In a transplanter, the combination with the plates C C bent inward and united at the forward end to form a blade B; of a shoe G applied to the rear end of the blade, and provided with a fastening bolt h to extend upward between the bent portions of the plates.

10. In a transplanter, the combination with the plates C C bent inward and downward at their forward ends, of a shoe G fitted to the said downwardly-projecting portions of the said plates.

In witness whereof we hereunto set our hands in the presence of two witnesses.

NILS O. STARKS.
JOHN A. JOHNSON.

Witnesses:
W. R. BAGLEY,
C. H. ALLYN.